(No Model.) 2 Sheets—Sheet 1.
E. S. HALL.
DEVICE FOR ACTUATING BRAKES.
No. 572,255. Patented Dec. 1, 1896.
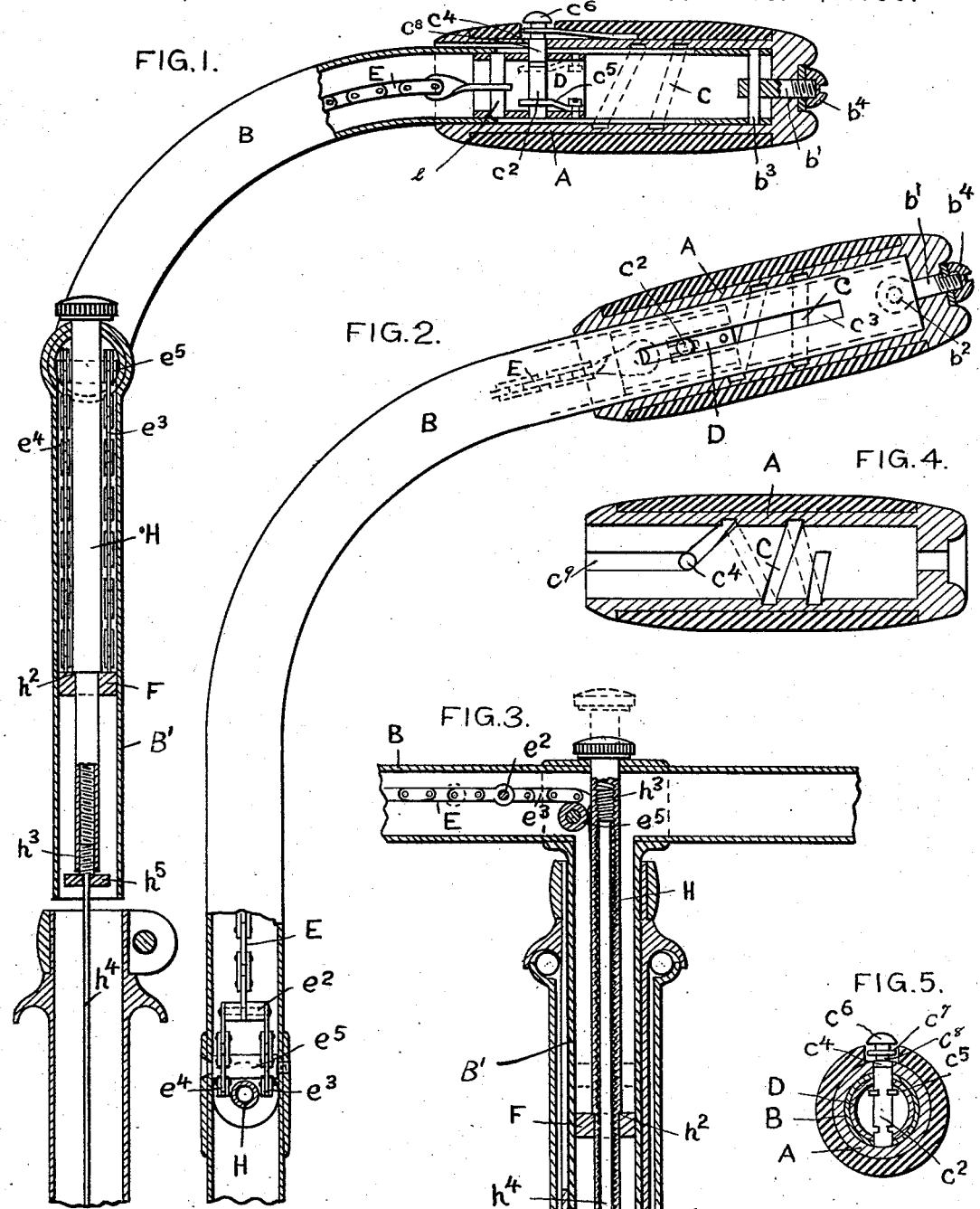

(No Model.) 2 Sheets—Sheet 2.
E. S. HALL.
DEVICE FOR ACTUATING BRAKES.
No. 572,255. Patented Dec. 1, 1896.
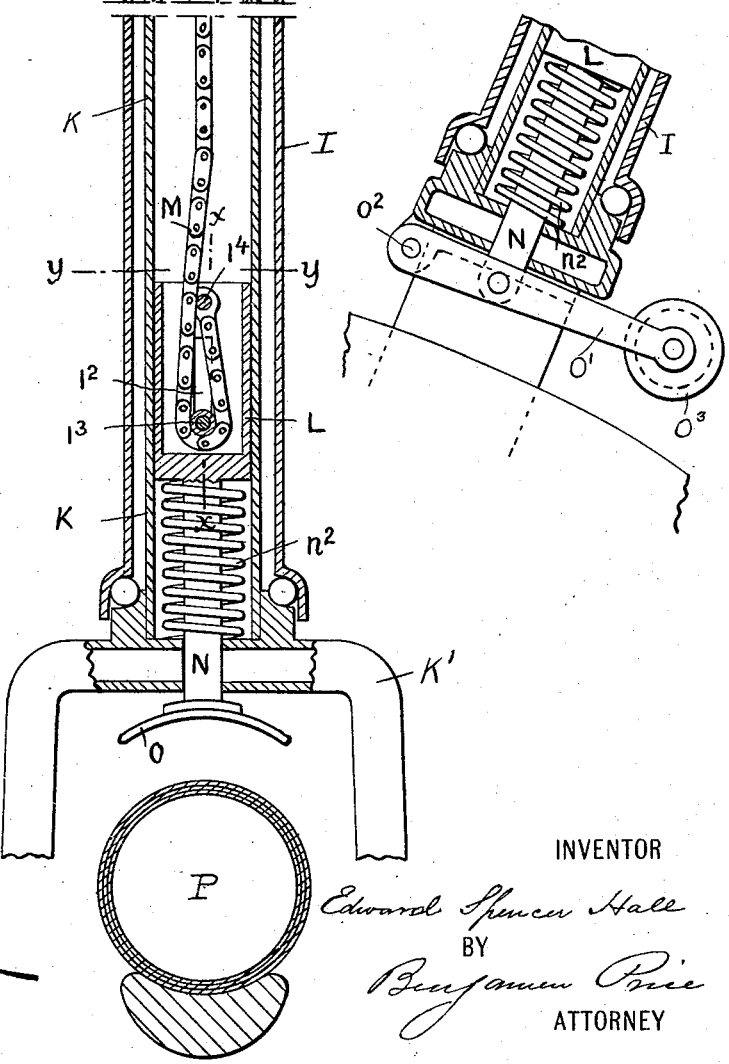
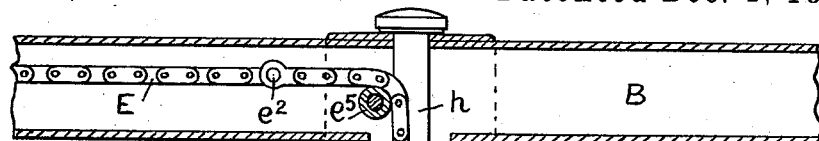
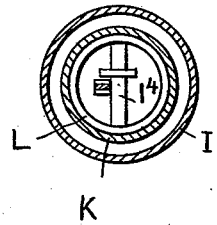
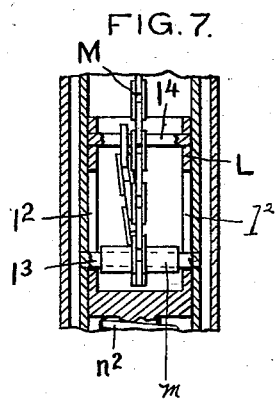
WITNESSES:
INVENTOR
Edward Spencer Hall
BY
Benjamin Price
ATTORNEY

UNITED STATES PATENT OFFICE.

EDWARD SPENCER HALL, OF NEW YORK, N. Y.

DEVICE FOR ACTUATING BRAKES.

SPECIFICATION forming part of Letters Patent No. 572,255, dated December 1, 1896.

Application filed February 17, 1896. Serial No. 579,673. (No model.)

*To all whom it may concern:*

Be it known that I, EDWARD SPENCER HALL, of the city of New York, county and State of New York, have invented certain new and useful Improvements in Devices for Actuating Brakes, of which the following is a specification.

The object of this invention is to provide simple, efficient, and convenient devices for operating brakes of bicycles, tricycles, or other vehicles from a handle-bar or movable part in reach of the rider. These devices are specially constructed and arranged to first permit bringing the acting surface of the brake very quickly to an opposing rotating contact-surface of the vehicle and then allow slower and more powerful movement of the brake to stop the vehicle in any emergency of travel. The intermediate connection of the brake is specially arranged to permit vertical adjustment of the vehicle-handles from one of which the brake is actuated, and especially provides that this vertical adjustment may be quickly and most conveniently made without removing or detaching any part of the vehicle or brake devices.

The invention will first be described, and then will be particularly defined in claims hereinafter set forth.

In the accompanying drawings, Figure 1 is a sectional side view of the handle-bar and a portion of the steering-head of a bicycle embodying the invention. Fig. 2 is a sectional plan view of parts shown in Fig. 1. Fig. 3 is a front vertical sectional elevation of the central parts of the handle-bar, the intermediate connection, and the steering-head. Fig. 4 is a longitudinal section of the brake-operating handle, showing the quick and slow pitched screw-thread therein. Fig. 5 is a cross-section of this handle and contained parts. Fig. 6 is an enlarged broken front sectional view showing the main parts of the intermediate connection and one form of brake device. Fig. 7 is an enlarged detail section taken on the line $x\,x$ in Fig. 6. Fig. 8 is a detail plan view in section on the line $y\,y$ in Fig. 6, and Fig. 9 is a detail sectional side view showing a modified brake device.

The brake-operating device herein shown comprises a handle A, fitted revolubly upon one end of the transverse head-piece or tube B. The handle A is held to the tube B by a bolt $b'$, having an eye $b^2$, through which and the tube B a pin $b^3$ passes. A head or nut $b^4$ screws upon the bolt outside of the closed end of the handle.

The handle A preferably has a metal interior lining in which is cut or formed a screw-thread C, having at its inner part a quick pitch and at its outer part a slow pitch. Within the handle-tube B is placed a movable part or slide D, across which is fitted loosely a pin-detent $c^2$, which is adapted to enter opposite longitudinal slots $c^3$ in the tube B, and is normally held into an aperture $c^4$, made through the metal lining at the junction of the quick-pitch portion of the thread C and a leading-in slot $c^9$, which extends, preferably straight, as shown, from said aperture $c^4$ to the forward end of the handle. The leading-slot $c^9$ admits the protruding end of the pin $c^2$ as the handle A is slipped endwise upon the tube B, and the slot $c^9$ also prevents backward rotation of the handle on the tube, but allows its forward rotation in proper direction to permit the pin to enter the spiral thread C to actuate the brake device. A spring $c^5$ on the part D projects the pin $c^2$ toward and into the aperture $c^4$.

A push-button $c^6$ in the handle is normally held outward by a suitable spring $c^7$, and the button has a stem $c^8$, which is adapted to press the pin $c^2$ out of the locking-aperture $c^4$ of the handle and permit the handle to be turned around to the right hand as the pin $c^2$ enters the spiral thread C. This turning of the handle carries the sliding part D backward in the tube B, at first with a quick movement while the pin $c^2$ is in the quick-pitch portion of the thread and afterward with a slower movement as the pin engages the slow-pitch portion of the thread. A correspondingly quick and slow pull thus is given the flexible chain or cord E of the intermediate connection acting between the operating device and the brake device.

The pull-chain E is suitably coupled, say by a pin $e$, to the slide D, and extends, preferably, within the handle-bar B to a pin $e^2$, from which the chain extends in two branches $e^3\,e^4$ over a pulley or guide $e^5$, and thence down the central tubular stem B' of the handle-bar, wherein the parts $e^3\,e^4$ are attached to a block F, which may slide in the stem. This stem B' enters the tubular stem K of the steering-wheel fork K', which turns in the usual tubular head I of the bicycle-frame. The two branches $e^3$ $e^4$ of the chain E give room between them for the upper tubular part H of a telescoping coupling having a lower part $h^4$, provided with an enlarged head formed as a screw $h^3$, which is adapted to an internal screw of the part H.

The tube H has a shoulder $h^2$, made, preferably, by reducing the diameter of its lower end, which passes freely through an aperture of the block F. The entire telescoping coupling H $h^4$ thus is sustained entirely by the shoulder $h^2$, resting on the block F, and, as the coupling-tube H extends to or through a guiding-hole in the top of the handle-bar, the coupling is always accessible and its part H may be turned freely in either direction to shorten or lengthen the coupling by means of its engaged screw-threads. The part H may also be uncoupled from part $h^4$ and be lifted from the handle-bar for inspection of the parts, and at such time the lower flat or rectangular part $h^4$ will be prevented from falling by contact of its enlarged screw-head with a guiding-detent $h^5$, fixed to stem B' and having a slot which receives the shank of part $h^4$, but will not allow its screw-head $h^3$ to pass through it. The detent $h^5$ thus holds the rod or part $h^4$ in position to engage the screw-thread of the readjusted upper portion H of the coupling. It will be specially noticed that by this construction the telescoping coupling may be adjusted in length as required by any desired vertical adjustment of the handle-bar, and the adjustment may almost instantly be made by simply turning the coupling part H in one direction or the other.

I am not aware of any prior brake mechanism having between the operating device and the brake device a telescoping intermediate connection which is instantly adjustable without requiring turning or removal of the handle-bar or removal of any portion of the brake connections or any part of the bicycle or vehicle.

To the lower end of the coupling part $h^4$ is attached a flexible pulling connection, such as a chain M, which enters a slide or plunger L, having side slots $l^2$, working on a cross-pin $l^3$, which is fixed in the fork-stem K. The chain passes around or under the pin $l^3$ or roller $m$ thereon, and thence passes upward and is fixed to a pin $l^4$, fastened in the plunger. A stem N on the plunger carries, as shown in Fig. 6, a spoon-brake device O, adapted to the wheel-tire P, while in Fig. 9 the stem N is pivoted to a lever O', fulcrumed at $O^2$ to the wheel-fork and carrying at its free end a roller-brake device $O^3$. With this construction as the chain M is drawn upward by the operating device the plunger L and brake O or $O^3$ will be moved downward or in the opposite direction, the reversed motion being due to the bight of the chain around the pin $l^3$. A spring $n^2$ on the stem N lifts or aids in lifting the brake from the wheel.

To operate the brake, the rider while holding the handle A will press in the latch-pin $c^6$, which pushes pin $c^2$ out of the locking-aperture $c^4$ and permits the handle to be turned around to the right hand. As the pin leaves the aperture $c^4$ it at once enters the "quick-pitch" portion of the handle screw-thread C, and as the handle turns part way around the chain E, the block F, the telescoping coupling H $h^4$, and the chain M are at once quickly drawn upon to carry the plunger L and brake O or $O^3$ quickly downward to the opposing tire P or other rotating contact-surface of the wheel or vehicle. The "slow-pitch" portion of the handle-thread C now begins to act and the brake is forced at less speed, but with far greater power, against the tire to quickly stop the vehicle. When the handle is turned back to the left hand, its screw-thread has the reverse effect of drawing the brake away from the wheel and readjusting the pulling connection, aided by the expanding spring $n^2$. The telescoping coupling rises with the block F, and the visible part H of the coupling thus serves as a gage or indicator attesting proper working of the brake. In practice the quick-pitch portion of the thread extends only about one-quarter around the handle, this being sufficient to quickly bring the brake into contact with the wheel.

Obviously the chain M may be connected with any form of brake device, such as a coil or band acting on the vehicle-axle or on a drum fixed to the axle, with the same effect of quickly taking up any slackness of the brake device or its connections by action of the quick portion of the handle-thread and thus bringing the brake into position to be instantly pressed against the opposing rotating contact-surface with the greatly-increased power and effect arising from the slower movement of the brake connections by the slow-pitch portion of the handle-thread.

I am aware that both brake and steering mechanisms have heretofore been actuated from a uniformly-pitched screw or screw-thread in a handle-bar. The prior handle-threads for brakes all have but one pitch of the screw, not giving the initial quick advance of the brake to the wheel or contact-surface and the subsequent slower forcible pressing of the brake thereto, as in my invention.

The most efficient brake is that one which can be applied with greatest power in the least time and with the least expenditure of force to stop a bicycle or vehicle quickly in any emergency of travel. When a brake is applied by means of a screw or screw-thread having a uniform quick pitch, the brake may be quickly brought to the wheel, but when there the quick thread fails to exert sufficient power on the brake to stop the vehicle quickly except when handled by persons of more than ordinary strength, and even in that case the too-sudden pressure of the brake on the wheel is liable to upset both rider and vehicle. On the other hand, when a brake is applied by means of a screw or screw-thread having a uniform slow pitch it consumes too much time to take up slackness of the brake or its connections by action of the slow thread and the brake is not applied promptly enough to prevent accidents which a brake is intended to obviate and should make impossible.

The successively-working quick and slow pitch screw in my operating device allows almost instant and danger-averting application of the brake whether the brake mechanism be handled by strong adults or by weaker persons or children, and is therefore more complete and efficient than any brake-operating mechanism known to me.

I am not limited to the precise construction and arrangement of parts herein shown and described, as the various novel features pointed out in the appended claims may be embodied in other forms by skilled mechanics without departing from the spirit or substance of my invention.

I claim as my invention—

1. Brake-operating devices comprising a revoluble handle provided with a screw having an initial quick pitch and a following slow pitch of thread, a movable part actuated by the screw, and connections from said movable part to the brake device.

2. Combined steering and brake-operating devices comprising a steering-bar coupled with the vehicle-wheel, a handle fitted revolubly on the steering-bar and provided with a screw having an initial quick pitch and a following slow pitch of thread, a movable part actuated by the screw, and connections from said movable part to the brake device.

3. Brake-operating devices comprising a tube, a handle fitted revolubly thereon and provided with an interior indented screw having an initial quick pitch and a following slow pitch of thread, a movable part within the tube and having a projection entering the indented screw of the handle, and connections from said movable part to the brake device.

4. Combined steering and brake-operating devices comprising a tubular steering-bar coupled with the vehicle-wheel, a handle fitted revolubly on the steering-bar and provided with an indented screw having an initial quick pitch and a following slow pitch of thread, a movable part within the steering-bar and having a projection entering the indented screw of the handle, and connections from said movable part to the brake device.

5. Brake-operating devices comprising a revoluble handle provided with an interior indented screw and a slot leading from the end of the handle to said screw and providing a lateral shoulder at the beginning of the screw, a movable part having a projection adapted to both the leading-slot and the screw, and connections from said movable part to the brake device, substantially as described, whereby the leading-slot guides the projection of the movable part to the screw and permits turning of the handle only in direction to cause said projection to enter the screw and operate the brake.

6. Brake-operating devices comprising a revoluble handle provided with an interior indented screw and a slot leading from the end of the handle to said indented screw and providing a lateral shoulder at the beginning of the screw permitting turning of the handle only in direction to operate the brake, said slot at its point of junction with the screw having a lateral handle-locking aperture; a movable part having a projecting latch adapted to the leading-slot, the screw and the locking-aperture; a push-button in the handle adapted to the latch for unlocking the handle, and connections from the movable latch-carrying part to the brake device.

7. Brake-operating devices comprising a revoluble handle provided with an interior indented screw and a slot leading from the end of the handle to the screw, said screw having an initial quick pitch and a following slow pitch of thread, a movable part having a projection adapted to both the leading-slot and the variably-pitched screw, said slot providing a lateral shoulder permitting turning of the handle only in direction causing the projection to enter the screw and actuate the brake, and connections from said movable part to the brake device.

8. Brake-operating devices comprising a brake, and means actuating it from a handle-bar including an intermediate connection comprising draft devices leading from the brake and its operating means and a telescoping screw-coupling loosely supported at its upper part by the draft devices of the operating means, and connected at its lower part to the brake-actuating draft devices.

9. Brake-operating devices comprising a brake, and means actuating it from a handle-bar including an intermediate connection comprising draft devices leading from the brake and its operating means and a telescoping screw coupling loosely supported at its detachable upper part by the draft devices of the operating means, and connected at its lower part to the brake-actuating draft devices; said upper part of the coupling being visible and thereby indicating the movement of the brake device.

10. Brake-operating devices comprising a brake, and means actuating it from a handle-bar consisting of flexible connections within the handle-bar and the vehicle-frame, a sliding block within the handle-bar stem and an extensible or telescoping coupling within the handle-bar stem and comprising a shouldered upper part resting loosely by its shoulder on the sliding block and a lower part adjustable on said shouldered upper part and coupled to the brake-operating draft device.

11. In brake-operating devices, the combination, with the brake device and its slide or plunger, of a fixed part in the plunger-guide, and a flexible connection leading from the brake-operating device and passing in a bight under or around said fixed part and connected to the plunger, substantially as described, whereby as the main draft portion of the flexible connection moves in one direction the plunger and the brake will be moved in the other direction to apply and release the brake.

12. Brake-operating devices comprising operating means on a handle-bar, a flexible connection E, connected to said operating means and having two branches $e^3$ $e^4$ entering the handle-bar stem, a sliding block F in the stem and connected to the parts $e^3$ $e^4$; a coupling comprising an interiorly-threaded upper tube H having a lower end loosely passing through the block F, and a shoulder $h^2$ resting on the block and a lower rod $h^4$ having screw-threads adapted to the threads of the tube H, and a draft connection between the rod $h^4$ and the brake device, substantially as described.

13. Brake-operating devices comprising operating means on a handle-bar, a flexible connection E connected to said operating means and having two branches $e^3$ $e^4$ entering the handle-bar stem, a sliding block F, in the stem and connected to the parts $e^3$ $e^4$; a coupling comprising an interiorly-threaded upper tube H having a lower end loosely passing through the block F and a shoulder $h^2$ resting on the block and a lower rod $h^4$ having screw-threads adapted to the threads of tube H, a draft connection between rod $h^4$ and the brake device, and a guiding-detent $h^5$ for rod $h^4$ preventing turning of the rod and also preventing its fall should the tube H be uncoupled from it, substantially as described.

14. The combination, with the brake device, of a connected plunger L fitted in the fork-stem K and having slots $l^2$, a pin $l^3$ crossing the plunger and entering its slots and fixed to the fork-stem, and a flexible connection as M leading from an operating device, entering the plunger, passing in a bight around the fixed pin $l^3$ and secured at $l^4$ to the plunger, substantially as described.

Signed at New York, in the county of New York and State of New York, this 6th day of February, 1896.

EDWARD SPENCER HALL.

Witnesses:
R. P. HESS,
MARGARET TURNER.